S. G. SILBERMAN.
ANTISKID ATTACHMENT FOR VEHICLE WHEELS.
APPLICATION FILED SEPT. 4, 1920.
1,378,289.
Patented May 17, 1921.
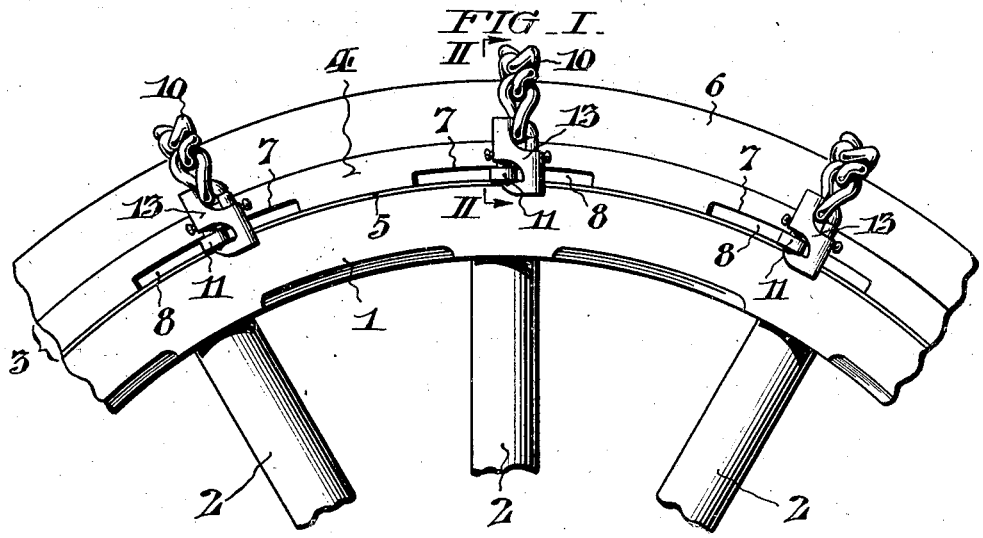
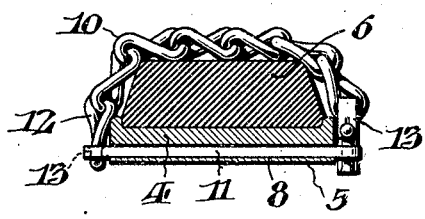
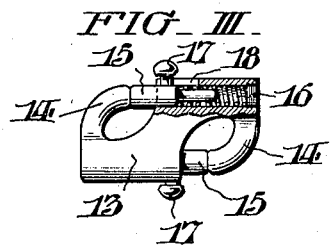
WITNESSES:
INVENTOR:
Samuel G. Silberman,
BY
ATTORNEYS.

UNITED STATES PATENT OFFICE.

SAMUEL G. SILBERMAN, OF PHILADELPHIA, PENNSYLVANIA.

ANTISKID ATTACHMENT FOR VEHICLE-WHEELS.

1,378,289.  Specification of Letters Patent.  Patented May 17, 1921.

Application filed September 4, 1920. Serial No. 408,209.

*To all whom it may concern:*

Be it known that I, SAMUEL G. SILBERMAN, a citizen of the United States, residing in Philadelphia, in the county of Philadelphia and State of Pennsylvania, have invented certain new and useful Improvements in Antiskid Attachments for Vehicle-Wheels, whereof the following is a specification, reference being had to the accompanying drawings.

The invention relates to attachments useful in connection with vehicle wheels having resilient tires in preventing slipping or skidding, and its object is to facilitate the application and removal of such devices to and from the wheel structure.

The advantages of my invention will be readily understood from the detailed description which follows.

In the drawings, Figure I is a view in side elevation of a portion of a vehicle wheel conveniently embodying my invention.

Fig. II is a cross sectional illustration of the same viewed in the direction of the arrows II—II in Fig. I; and Fig. III is a detail view of the clasp which I employ in attaching the anti-skid chains.

Referring first to Figs. 1 and II, it will be observed that the wheel structure comprises a felly 1, which is supported from a central hub (not illustrated) by radial spokes such as shown at 2—2. Set upon the felly 1 is a rim structure 3 comprising a main element or rim 4, and an internally fitting hoop band 5 preferably of even width. The outer face of the element 4 is appropriately channeled, as best seen in Fig. II, for the reception and the retainment of a resilient tire 6, shown in the present connection, as being of the solid rubber type. Upon its inner periphery, the element 4 has a series of notches or depressions 7—7 of a comparatively shallow depth radially, which are disposed preferably at regular intervals, and curved concentrically with respect to the rim. By coöperation, hoop band 5 and the depressions 7—7 establish, about said rim structure subjacent the tire retaining seat, a circle of concentric slots 8 which extend from side to side of the rim. The band 5 may be secured permanently to the element 4 either by spot welding, riveting or in any other manner, as may be found most convenient in practice.

Associated with each of the slots 8, is an anti-skid chain 10 adapted to extend around and across the tire 6. The ends of each of the chains 10 are attached to the protruding extremities of a comparatively slim member or bar 11, which extends transversely through the slot 8 and has capacity for free movement therein. One end of the chain is preferably permanently attached to the bar 11, and this may be accomplished for example by engaging its end link 12 directly within an aperture 13, in one extremity of said bar. In order, however, that the non-skid assembly may be readily removed when not needed, the opposite end of the chain 10 is detachably secured to the bar 11. For this purpose, I employ a twin hook clasp 13, the details of which are more clearly set forth in Fig. III. Coöperative with each hook 14 of this clasp is a retractable locking pin 15, which is normally maintained in the protruded position shown by a helical compression spring 16 concealed in the body of the clasp. Said pin is made shiftable by means of a knobbed finger stud 17 projecting through a slot 18 in the side wall of the spring socket.

In practice, the chains 10 by reason of their attachment to the movable connecting bars 11 are free to creep or shift along the tread of the tire within the limits imposed by the slots, so that wear may be evenly distributed in a manner already well understood.

The rim structure above set forth, it will be readily seen, is sturdy and comparatively simple, and accordingly may be very economically manufactured. Moreover, by reason of their allocation within the structure, the guide slots 8 for the bars 11 of the antiskid chains are amply protected both against clogging and accidental injury. The scheme of attaching the chain assembled as herein shown, is also very simple, yet sure, and said chains may be quickly attached or detached with minimum loss of time.

While I have illustrated and described my invention in association with a rim mounting for solid tires, it is of course obvious that the same may be applied with equal facility to rims adapted for the mounting of pneumatic tires.

Having thus described my invention, I claim:

1. The combination of a retaining seat for a resilient vehicle tire having therethrough a transverse opening from side to side subjacent to the tire, and relatively shallow radially with reference thereto; a non-skid chain extending around and across the tire from one end of the opening to the other; and a slim member extending through said transverse opening attached to said chain at one end and detachably connected thereto at its other end.

2. The combination of a retaining rim for a resilient tire having from side to side therethrough, a series of narrow slots concentrically arranged in a circle about said rim subjacent the tire; a non-skid chain associated with each of said slots and extending around and across the tire; and a connecting bar extending transversely through each of said slots and protruding beyond the sides of the rim to afford attachment for the ends of the associated chain, said bars being capable of free movement within the confines of the slots to permit shifting of the attached chains along the tread of the tire.

3. The combination of a retaining rim for a resilient vehicle tire, said rim having a series of concentric depressions about its inner periphery; an internally fitting hoop band forming by coöperation with the said depressions, a circle of concentric slots about said rim; a non-skid chain associated with each of said slots and extending around and across the tire; and a connecting bar extending transversely through each of said slots and protruding beyond the sides of the rim to afford attachment for the ends of the associated chain.

In testimony whereof, I have hereunto signed my name at Philadelphia, Pennsylvania, this 1st day of September, 1920.

SAMUEL G. SILBERMAN.

Witnesses:
  JAMES H. BELL,
  ANNA M. PETTERSON.